(12) United States Patent
Pihlsgård et al.

(10) Patent No.: US 12,251,990 B2
(45) Date of Patent: Mar. 18, 2025

(54) AIR VENT DEVICE FOR A VENTILATION SYSTEM OF A VEHICLE

(71) Applicant: Ningbo Geely Automobile Research & Development Co., Ltd., Ningbo (CN)

(72) Inventors: Måns Pihlsgård, Gothenburg (SE); Johan Setterberg, Gothenburg (SE)

(73) Assignee: Ningbo Geely Automobile Research & Dev. Co., Ltd., Ningbo (CN)

(*) Notice: Subject to any disclaimer, the term of this patent is extended or adjusted under 35 U.S.C. 154(b) by 694 days.

(21) Appl. No.: 17/384,296

(22) Filed: Jul. 23, 2021

(65) Prior Publication Data

US 2021/0347231 A1 Nov. 11, 2021

Related U.S. Application Data

(63) Continuation of application No. PCT/CN2020/074273, filed on Feb. 4, 2020.

(30) Foreign Application Priority Data

Feb. 7, 2019 (EP) .................................. 19156081

(51) Int. Cl.
*B60H 1/34* (2006.01)

(52) U.S. Cl.
CPC ..... *B60H 1/345* (2013.01); *B60H 2001/3471* (2013.01)

(58) Field of Classification Search
CPC ............. F24F 2013/1493; B60H 1/345; B60H 1/3414; B60H 2001/3471
USPC ........................................................ 454/155
See application file for complete search history.

(56) References Cited

U.S. PATENT DOCUMENTS

| 6,805,624 B2 * | 10/2004 | Currle ................... | B60H 1/345 454/143 |
| 2018/0319253 A1* | 11/2018 | Martinez ................ | B60H 1/249 |
| 2019/0234646 A1* | 8/2019 | Seo ......................... | F24F 13/10 |

FOREIGN PATENT DOCUMENTS

| CN | 101992671 A | | 3/2011 |
| CN | 104097486 A | | 10/2014 |
| CN | 207094934 U | * | 3/2018 |
| CN | 108698483 A | | 10/2018 |
| CN | 109210748 A | | 1/2019 |
| DE | 102007038212 A1 | | 2/2009 |
| DE | 102017006124 A1 | | 1/2019 |
| DE | 102018201797 A1 | | 8/2019 |
| DE | 102019000031 A1 | | 1/2020 |
| GB | 2156067 A | | 10/1985 |
| JP | 2017030684 A | | 2/2017 |

(Continued)

OTHER PUBLICATIONS

International Search Report from corresponding International Application No. PCT/CN2020/074273, Apr. 24, 2020, 3 pages.

*Primary Examiner* — Allen R. B. Schult
(74) *Attorney, Agent, or Firm* — Tucker Ellis LLP

(57) ABSTRACT

An air vent device for a ventilation system of a vehicle. The device has a pipe forming an air channel for providing air to a compartment of the vehicle and a diffuser for disturbing the airflow provided to the vehicle compartment. The diffuser has a portion made of a flexible material which diffuser portion is arranged to cover a part of a cross-section area of the air channel and the diffuser portion is expandable for varying the size of the covered part of the air channel cross section area.

8 Claims, 9 Drawing Sheets

(56) References Cited

FOREIGN PATENT DOCUMENTS

WO  2016038620 A1  3/2016

* cited by examiner

AIR VENT DEVICE FOR A VENTILATION SYSTEM OF A VEHICLE

RELATED APPLICATION DATA

This application is a continuation of International Patent Application No. PCT/CN2020/074273, filed Feb. 4, 2020, which claims the benefit of European Patent Application No. 19156081.2, filed Feb. 7, 2019, the disclosures of which are incorporated herein by reference in their entireties.

TECHNICAL FIELD

The invention relates to an air vent device for a ventilation system of a vehicle, which device has a pipe forming an air channel for providing air to a compartment of the vehicle and a diffuser arranged for disturbing the airflow provided to the vehicle compartment.

BACKGROUND

In A/C systems or HVAC-systems (Heating, Ventilation and Air Conditioning) for vehicles it is possible to control the flow rate of air into a vehicle compartment. Further, air nozzles for providing the air to the vehicle compartment can be electrically controlled for directing and focusing (or defocusing) the airflow. Focusing or defocusing the airflow by changing the "cone" formed by the flowing air will increase or decrease the airflow rate. This can be performed by an actuator arranged for adjustment of the shape and size of the air nozzle.

It can however still be a problem with an airflow cooling the skin of a driver or a passenger of a vehicle in an undesired way, particularly in a hot climate when the desired temperature of the air in the vehicle compartment cannot be reached unless the airflow rate from the A/C system is relatively high.

SUMMARY

An objective of the invention is to provide an air intake device for a ventilation system of a vehicle, by which device the air can be provided into a vehicle compartment in a way allowing a relatively high airflow rate at the same time as undesired airflow towards a driver or passenger of the vehicle can be avoided or at least reduced.

The objective is achieved by an air vent device for a ventilation system of a vehicle, wherein the device has a pipe forming an air channel for providing air to a compartment of the vehicle and a diffuser arranged for disturbing the airflow provided to the vehicle compartment, and wherein the diffuser has a portion made of a flexible material which diffuser portion is arranged to cover a part of a cross-section area of the air channel and the diffuser portion is expandable for varying the size of the covered part of the air channel cross section area.

The invention is based on the insight that by such an air intake device, at least a large part of the airflow directed towards an occupant can be blocked in order to avoid discomfort for the occupant at the same time as the airflow rate can be relatively high for reaching the desired air temperature in the vehicle compartment.

The air channel cross-section area covered by the diffuser portion is the area of the air channel overlapping with the diffuser portion when looked at the diffuser portion in a longitudinal direction of the pipe.

Some examples of "flexible material" for the diffuser portion are different kinds of textile fibre in the form of a fabric for instance, and different kinds of rubber material in the form of a rubber sheet for instance. Such materials are flexible and durable and can adopt different shapes.

According to one embodiment of the air intake device, the diffuser is foldable between an unfolded state, where said diffuser portion covers a major part of the cross-section area of the air channel, and a folded state, where said diffuser portion covers a minor part of the cross-section area of the air channel. Hereby, the diffuser function and its impact on the airflow can be selected by a driver.

By "major part" is meant over 50%, preferably over 70% of the total cross-section area of the air channel. By "minor part" is meant less than 20%, preferably less than 10% of the total cross-section area of the air channel.

The diffuser portion can have the shape of a circular disc in the unfolded state of the diffusor.

The diffuser portion is preferably arranged to cover a central part of the air channel cross-section area. Hereby, the air flowing past the diffuser portion can be forced to flow along the periphery of the pipe and to leave the nozzle opening in a direction angled outwardly relative to the main airflow direction in the pipe.

According to a further embodiment of the device, the pipe has a mouth for discharging air into the vehicle compartment and the diffuser portion is arranged at the mouth of the pipe. By arranging the diffuser portion at the mouth or nozzle opening, the impact of the diffuser portion on the airflow can be optimized.

The diffuser can have a support member extending in the longitudinal direction in the centre of the pipe where the diffuser portion is arranged on the support member. Hereby, the diffuser portion can be arranged at the mouth of the pipe without any additional components arranged in the vehicle compartment for this purpose.

According to a further embodiment of the device, the diffuser portion is displaceable in a longitudinal direction of the pipe for adjustment of the distance between the mouth of the pipe and the diffuser portion while maintaining the size of the diffuser portion. Hereby, the impact of the diffuser can be varied for one and the same diffuser portion size.

According to another embodiment of the device, the diffuser has pivotable link arms arranged for shifting from the folded state to the unfolded state of the diffuser while expanding the diffuser portion. Hereby, a rational and non-complicated way of expanding the diffuser portion can be achieved, particularly for stretching the diffuser portion when made from a fabric.

According to a further embodiment of the device, the diffuser has an inner shaft and an outer shaft, wherein the inner shaft and the outer shaft are arranged concentrically relative to each other forming a telescopic function arranged for shifting between the folded state and the unfolded state of the diffuser, and preferably each link arm has a first end connected to the diffuser portion and a second end pivotally connected to the inner shaft or the outer shaft. Hereby, the diffuser function can be easily operated, for example by a motor displacing the inner shaft and the outer shaft relative to each other.

According to a further embodiment of the device, the diffuser portion is inflatable for expanding the diffuser portion. Hereby, a design with few mechanical components can be achieved, and components already included in the A/C system, such as a fan, can be used for expanding the diffuser portion.

According to a further embodiment of the device, the diffuser portion has a circular shape in the unfolded state. Hereby, a relatively non-complicated design can be used for making the diffuser portion expandable for varying the size thereof.

According to a further embodiment of the device, the diffuser portion has a parabolic shape in the unfolded state. Hereby, a robust diffuser portion that can withstand a relatively high airflow can be achieved.

According to a further embodiment of the device, a concave surface of the diffuser portion is faced against a main air flow direction of the air channel. Hereby, the airflow can be disturbed for creating turbulence which will promote mixing of the air.

Further advantages and advantageous features of the invention are disclosed in the following description and the claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
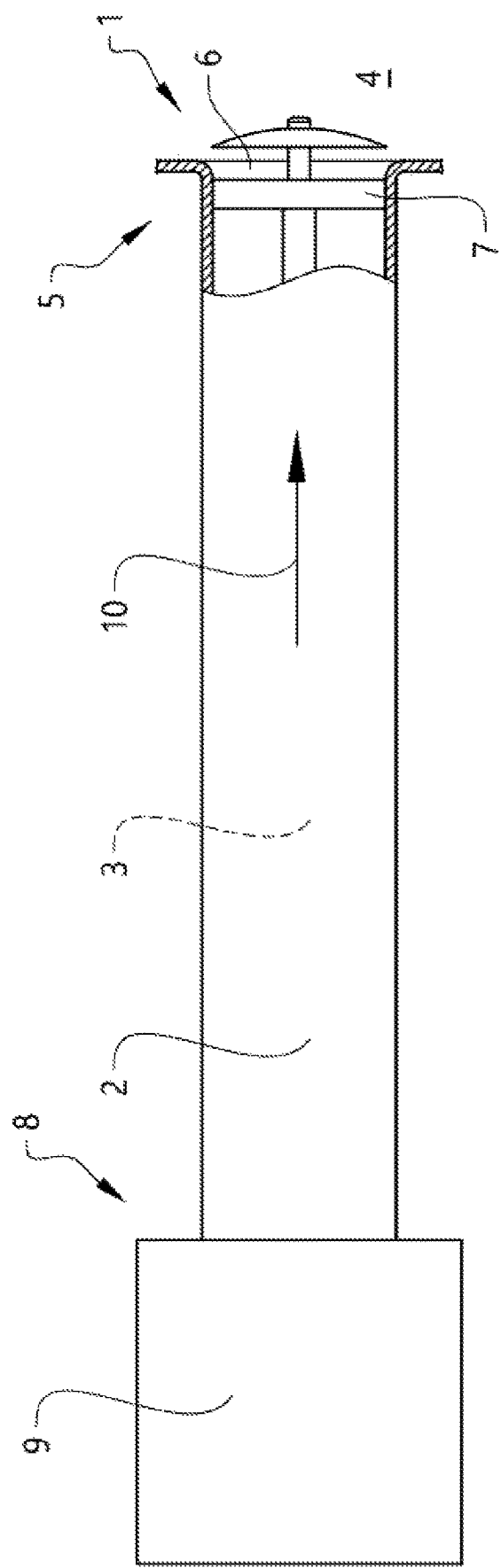
FIG. 1 is a schematic view of an air vent device for a ventilation system of a vehicle.

FIG. 1 shows a schematic view of an air vent device 1 for a ventilation system of a vehicle. The device 1 has a pipe 2 forming an air channel 3 for providing air to a compartment 4 of the vehicle. A first end 5 of the pipe 2 has a mouth 6 for discharging air into the compartment 4. The mouth 6 can be formed by any suitable nozzle 7 arranged at the first end 5 of the pipe 2 or just the pipe end. A second end 8 of the pipe 2 is connected to an air source 9 such as an A/C system or HVAC-system comprising a fan blowing air to the vehicle compartment 4. The main direction of the air flow in the air channel 3 is from left to right as indicated by an arrow 10.

Figure 2A:
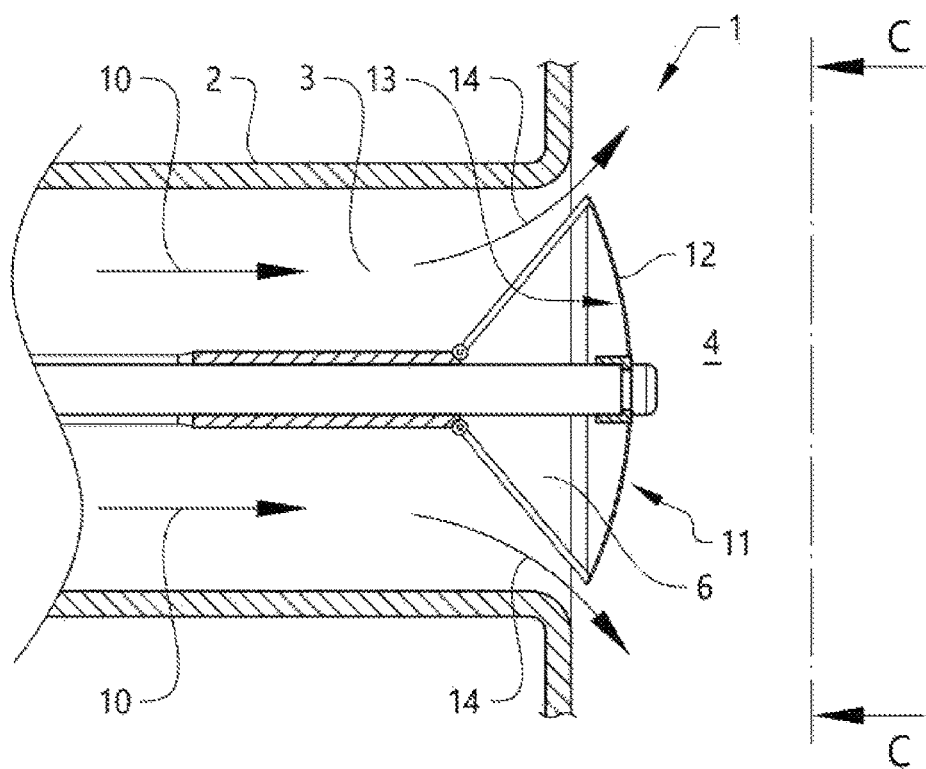
FIG. 2A is an enlarged view showing a diffuser of the air vent device in an unfolded state.

FIG. 2A shows an enlarged view of the air vent device 1, where a diffuser 11 of the air vent device is in an unfolded state. The air vent device 1 comprises the diffuser 11 for disturbing the airflow provided to the vehicle compartment 4. The diffuser 11 is suitably arranged at the mouth 6 of the pipe 2. The diffuser 11 has a portion 12 made of a flexible material which diffuser portion 12 is arranged to cover a part of a cross-section area of the air channel 3 and thereby blocking air flowing in the main flow direction 10. The diffuser portion 12 is expandable for varying the size of the covered part of the air channel cross-section area.

The diffuser 11 can be foldable between an unfolded state, where said diffuser portion 12 covers a major part of the cross-section area of the air channel 3, and a folded state, where said diffuser portion 12 covers a minor part of the cross-section area of the air channel 3. In the unfolded state the diffuser portion is suitably disc-shaped. The diffuser portion can have a circular shape in the unfolded state. In the example embodiment illustrated in FIG. 2A, the diffuser portion has a parabolic shape and a concave surface 13 of the diffuser portion 12 is faced against the main air flow direction 10 in the air channel 3 of the pipe 2.

The diffuser portion 12 is preferably arranged to cover a central part of the air channel cross-section area, thereby blocking the airflow in the centre of the air channel 3. The diffuser portion 12 is suitably arranged at the mouth 6 of the pipe 2. In other words; the diffuser portion 12 is arranged close to the mouth 6 of the pipe 2, for example in the mouth 6 or just outside the mouth 6, preferably on the vehicle compartment 4 side, as illustrated. As further illustrated in FIG. 2A, air flowing past the diffuser portion 12 will be forced to leave the pipe 2 at the mouth 6 in a direction 14 different from the main flow direction 10. The airflow direction 14 at the mouth 6 is outwardly angled relative to the main flow direction 10.

Figure 2B:
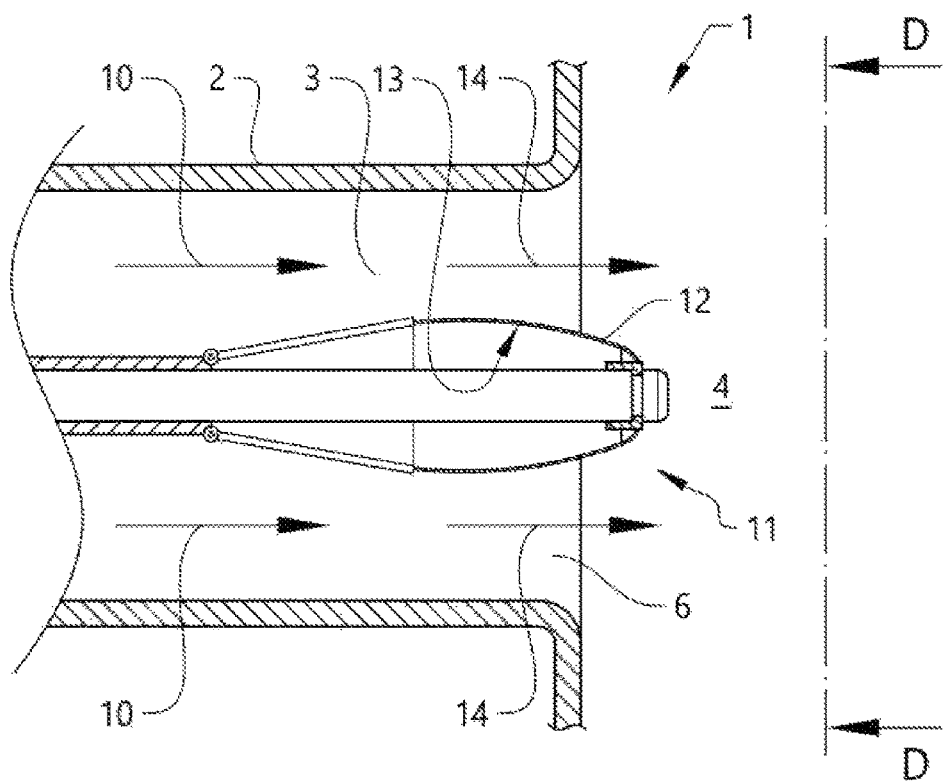
FIG. 2B shows the diffuser in FIG. 2A in a folded state.

FIG. 2B shows an enlarged view of the air vent device 1, where the diffuser 11 of the air vent device is in a folded state.

Figure 2C:
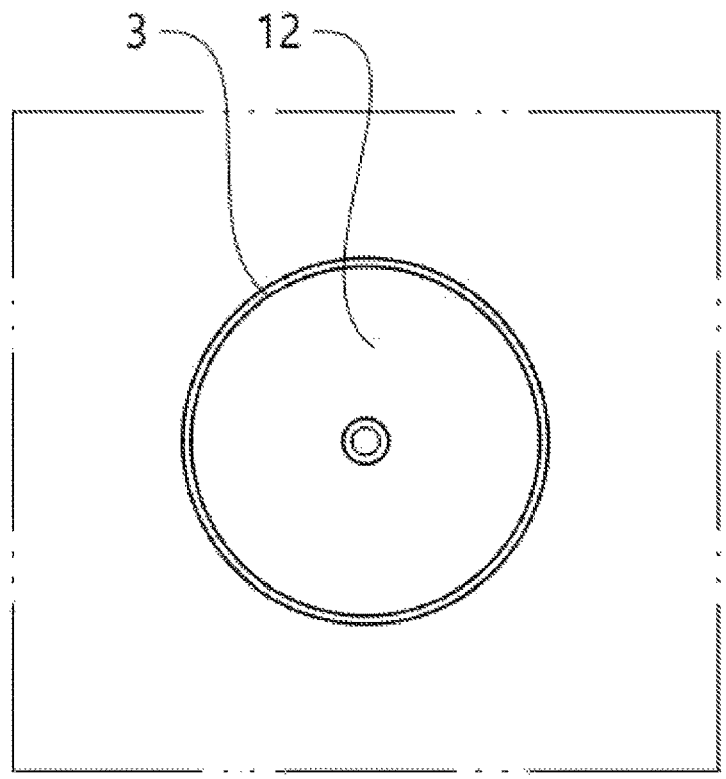
FIG. 2C is a view taken along C-C in FIG. 2A.
Figure 2D:
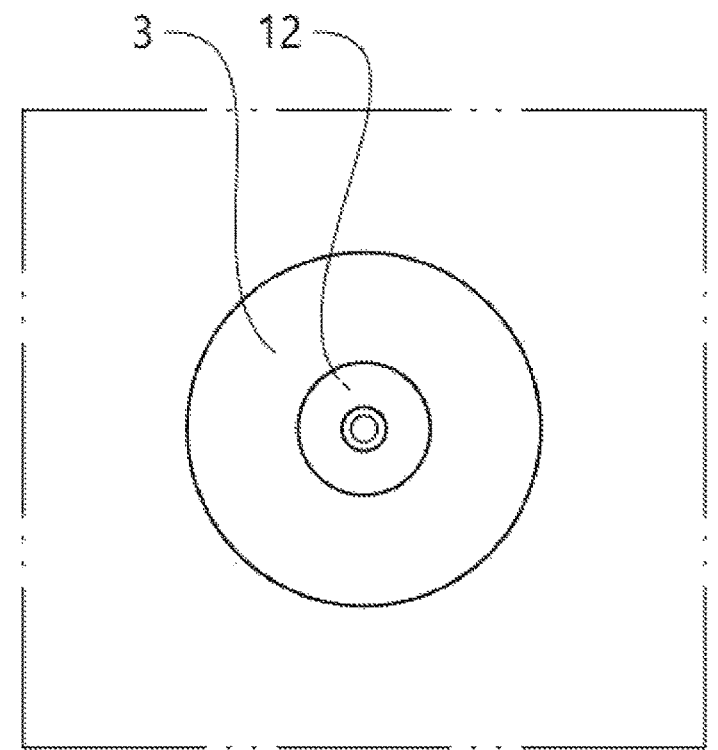
FIG. 2D is a view taken along D-D in FIG. 2B.

FIG. 2C and FIG. 2D show views taken along C-C and D-D in FIGS. 2A and 2B, respectively.

In FIGS. 2C and 2D, the area covered by the diffuser portion 12 in the unfolded state of the diffuser and the area covered by the diffuser portion 12 in the folded state of the diffuser are illustrated. In FIG. 2C, the diffuser portion covers a major part of the air channel cross-section area at the mouth of the pipe, whereas in FIG. 2D the diffuser portion 12 covers a minor part of the air channel cross-section area at the mouth.

Figure 3A:
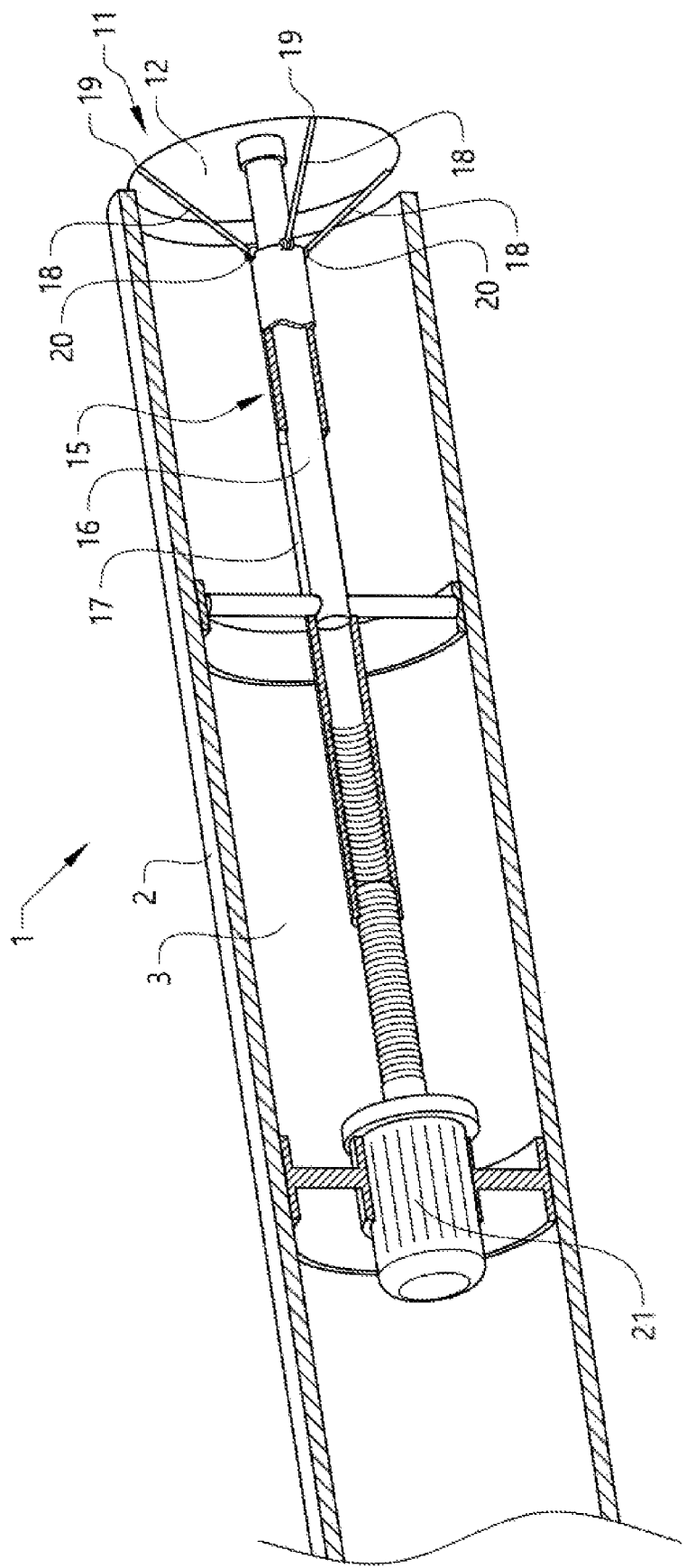
FIG. 3A is a partly cut perspective view showing an example embodiment of an air vent device with a diffuser in an unfolded state.
Figure 3B:
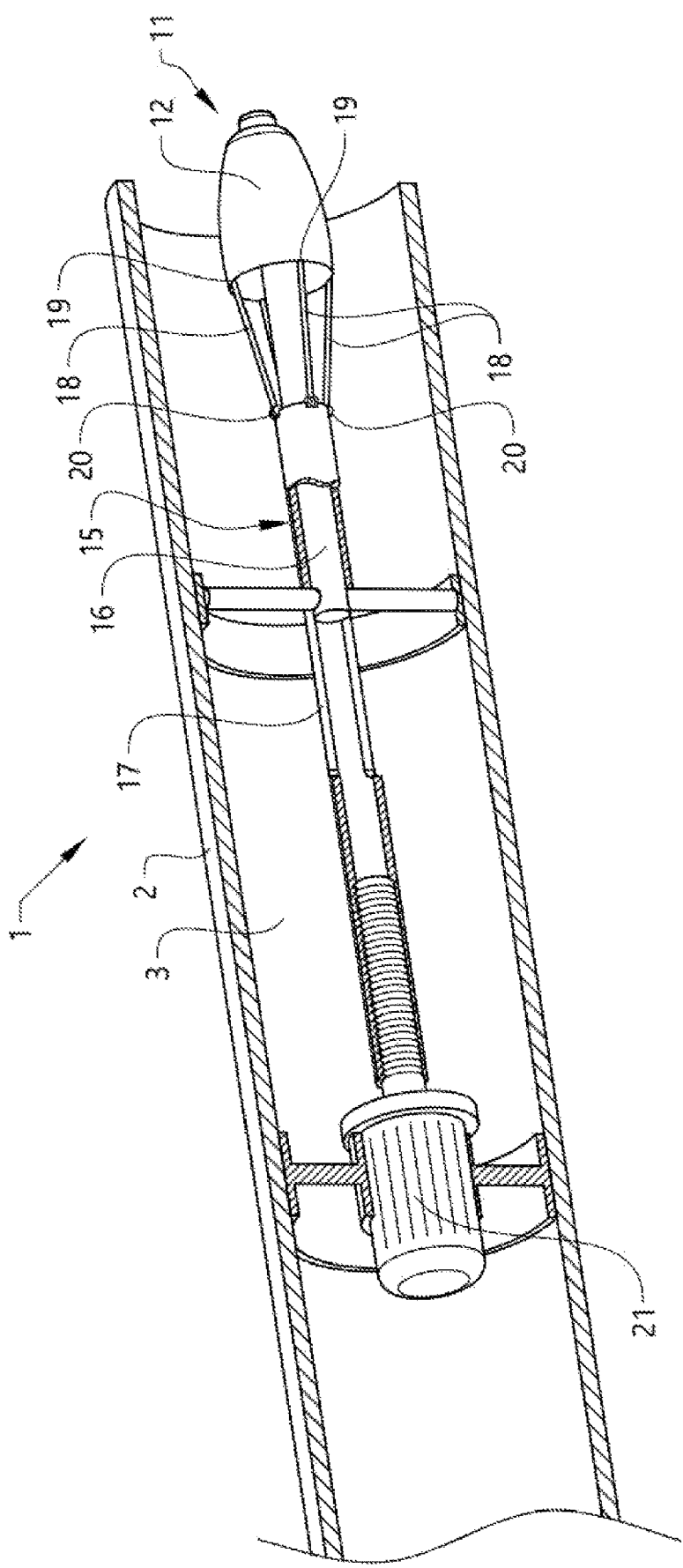
FIG. 3B shows the air vent device in FIG. 3A where the diffuser is folded.

FIGS. 3A and 3B are partly cut perspective views showing an example embodiment of an air vent device. The expandable diffuser can be realized by means of an "umbrella"-function. FIGS. 3A and 3B show an example embodiment of an air vent device where such an umbrella function is used for achieving the unfolded state and the folded state of the diffuser. FIG. 3A shows the diffuser in the unfolded state and FIG. 3B shows the diffuser in the folded state.

The diffuser 11 can have a support member 15 extending in the longitudinal direction in the centre of the air channel 3 of the pipe 2 where the diffuser portion 12 is arranged on the support member 15. In the example embodiment illustrated in FIGS. 3A and 3B, the diffuser 11 has an inner shaft 16 and an outer shaft 17 which constitute such a support member 15. The inner shaft 16 and the outer shaft 17 which are arranged concentrically relative to each other forming a telescopic function are also arranged for shifting between the folded state and the unfolded state of the diffuser 11. For shifting from the folded state to the unfolded state of the diffuser 11 while expanding the diffuser portion 12, the diffuser has also pivotable link arms 18. The diffuser portion 12 which can be made by fabric for instance is connected to the inner shaft 16 at the centre of the diffuser portion. Further, each link arm 18 has a first end 19 connected to the diffuser portion 12 and a second end 20 pivotally connected to the outer shaft 17. The inner shaft 16 and the outer shaft 17 are displaceable relative to each other and by displacement of the outer shaft 17 relative to the inner shaft 16 the diffuser portion 12 can be folded and unfolded.

Starting from the unfolded state illustrated in FIG. 3A, displacement of the outer shaft 17 in a direction from right to left will cause the diffuser portion 12 to be folded and starting from the folded state illustrated in FIG. 3B, displacement of the outer shaft 17 in the direction from left to right will cause the diffuser portion 12 to expand to the unfolded state. The relative motion of the inner shaft 16 and the outer shaft 17 can be performed by an electric motor 21 connected to the outer shaft 17 through a threaded joint, such as a ball screw.

The diffuser portion 12 arranged to cover a part of a cross-section area of the air channel 3 is made by a flexible material such as any suitable fabric which also enables the "umbrella"-function.

It should be stressed that the diffuser portion 12 could be made by a partly air permeable material, though a material impermeable to air often is preferred, or a material which at least will block a major part of the airflow directed to the diffuser portion. For example, a material which will block more than 50%, suitably more than 80% and preferably more than 90% of the airflow directed towards the diffuser portion.

Figure 4A:
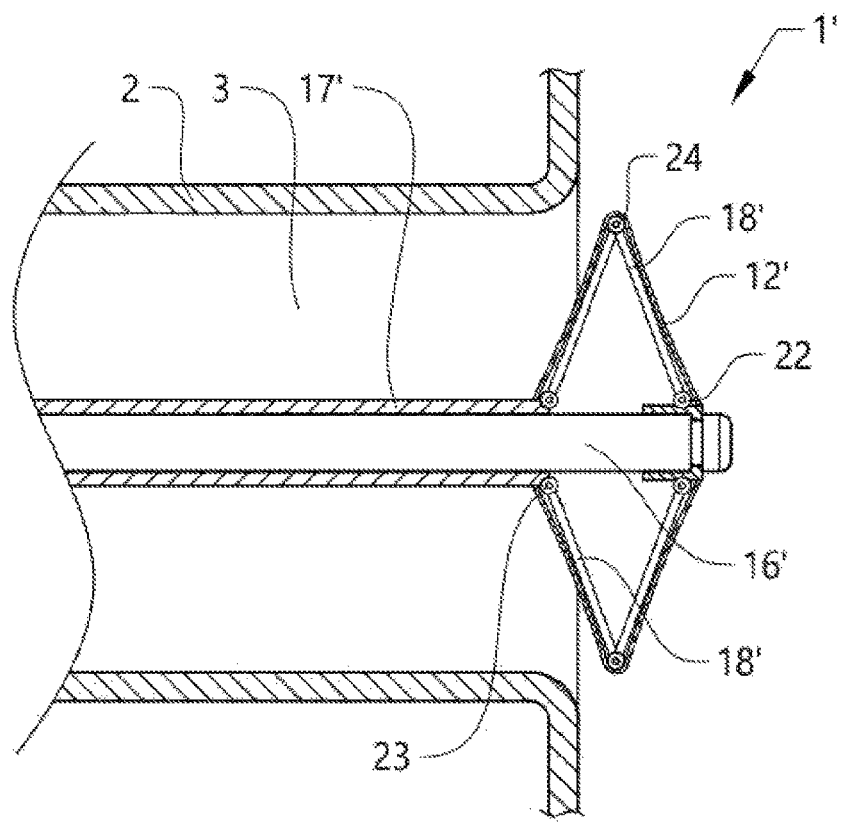
FIG. 4A is further variant of an air vent device with a diffuser in an unfolded state.

FIG. 4A shows a further variant of an air vent device 1' for a ventilation system of a vehicle. The diffuser portion 12' comprises a hose made from a flexible material, such as a fabric or similar. A first end 22 of the hose 12' is attached to an inner shaft 16' and second end 23 of the hose 12' is attached to an outer shaft 17' arranged concentrically around the inner shaft. A plurality of link arms 18' is arranged inside the hose 12' between the hose and the inner shaft. These link arms 18' are pivotally connected to the inner shaft 16' and to the outer shaft 17'. Further, each link arm 18' has a pivot joint 24 suitably in the middle of the link arm 18'.

Figure 4B:
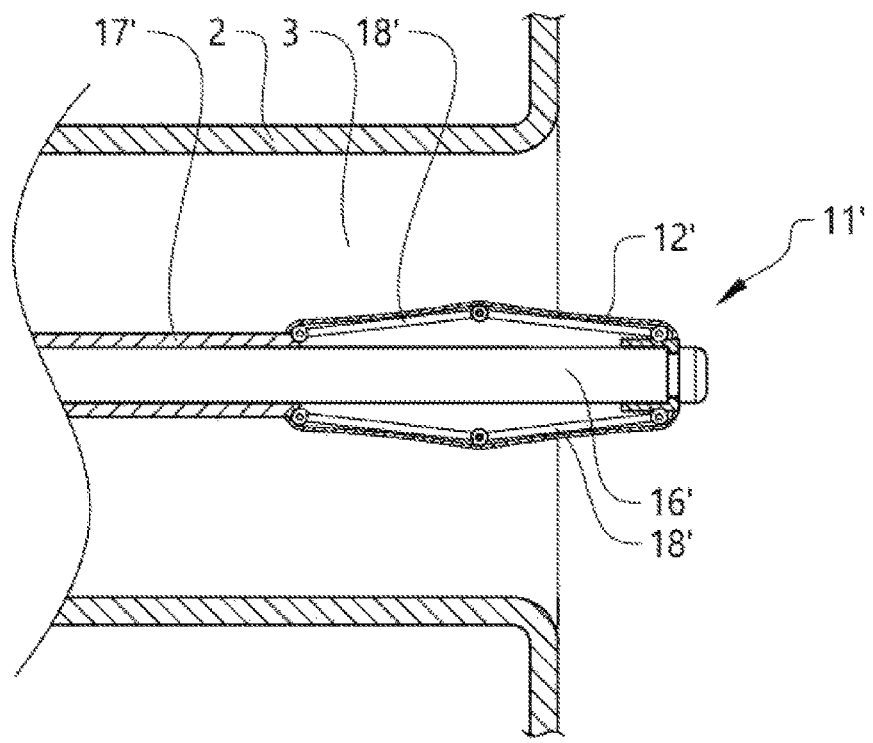
FIG. 4B shows the air vent device illustrated in FIG. 4A where the diffuser is folded.

FIG. 4B shows the diffuser portion 12' in the folded state of the diffuser 11'. By displacement of the inner shaft 16' and the outer shaft 17' relative to each other, the diffuser portion 12' can be expanded by movement of the link arms 18' to the unfolded state illustrated in FIG. 4A, and vice versa.

Figure 5:
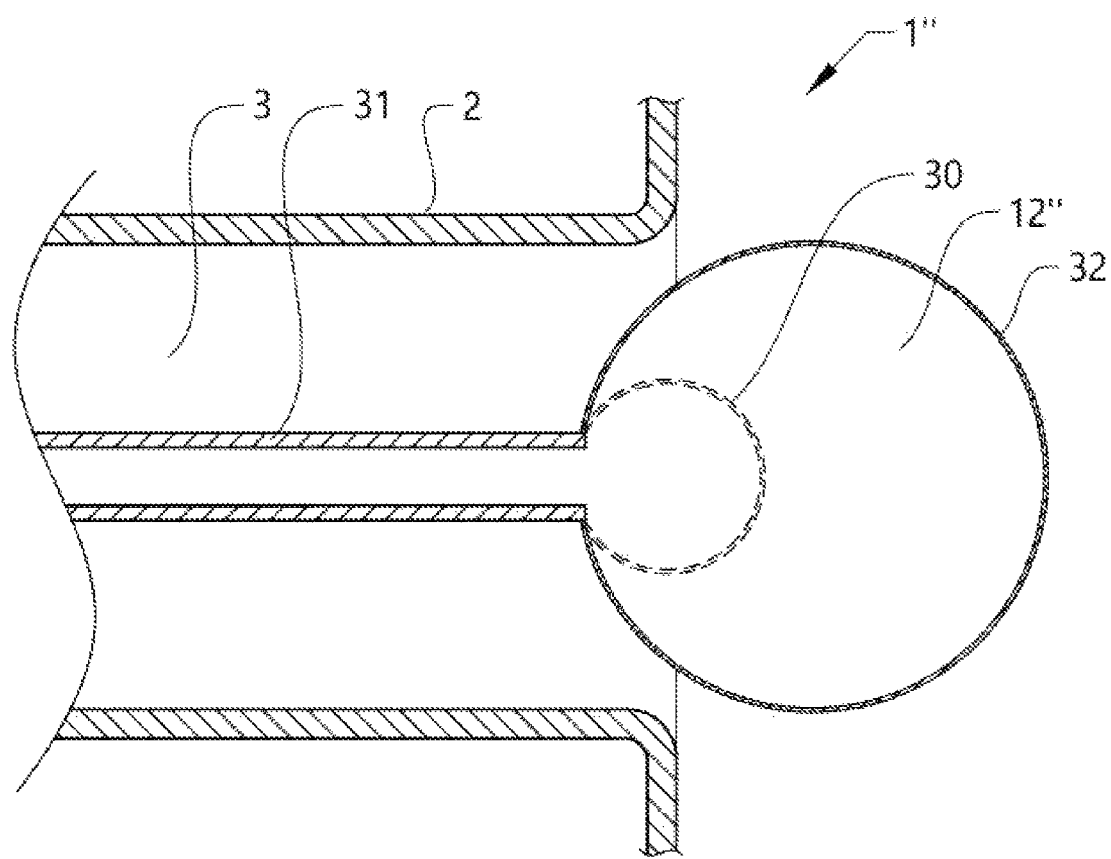
FIG. 5 is a further variant of an air vent device with an inflatable diffuser portion.

FIG. 5 shows a further variant of an air vent device 1" for a ventilation system of a vehicle. The diffuser portion 12" is inflatable for expanding the diffuser portion. The diffuser portion 12" is illustrated both when inflated and not inflated. A dashed line 30 indicates the size of the diffuser portion 12" when the diffuser portion is not inflated, whereas the solid line 32 indicates the size of the diffuser portion 12" when the diffuser portion is inflated. The flexible material used for the diffuser portion can be a rubber material or similar suitable to be inflated. The diffuser portion can be arranged on a tube 31. The tube can be connected to an air source and a valve system for providing air to the diffuser portion. For example, air can be supplied from the A/C system or HVAC-system used for providing air to the vehicle compartment. Optionally, any other suitable gas could be used for inflating the diffuser portion.

In all example embodiments described herein, in addition to the expandable function, the diffuser portion could also be displaceable in a longitudinal direction of the pipe for adjustment of the distance between the mouth of the pipe and the diffuser portion while maintaining the size of the diffuser portion. Such adjustment of the relative positions of the mouth and the diffuser portion can be also be used for controlling the airflow into the vehicle compartment.

Figure 6:
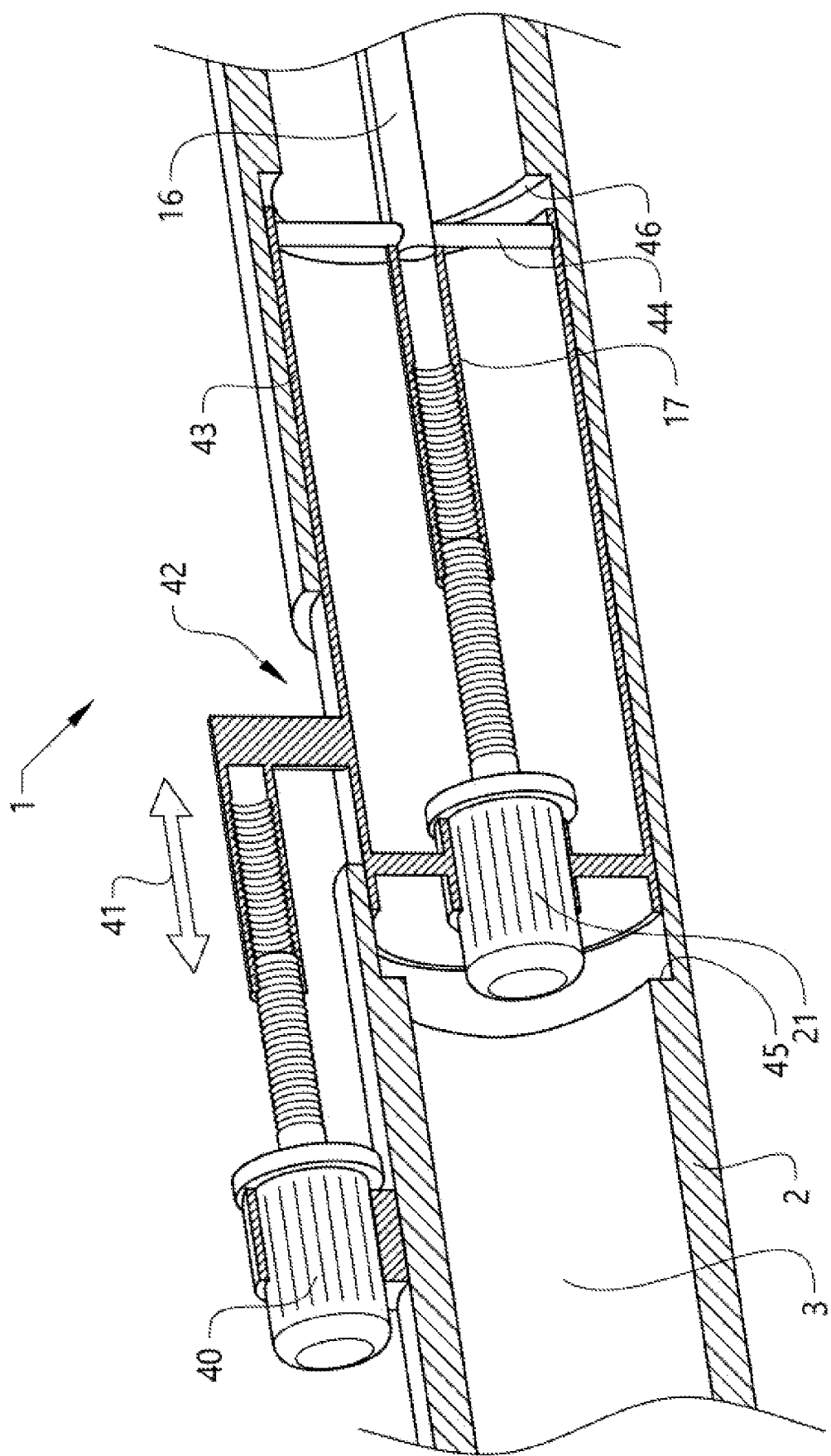
FIG. 6 shows an example embodiment where the diffusor portion is displaceable in a longitudinal direction of the pipe of the air vent device.

In FIG. 6, an example embodiment where the diffuser portion 12 is displaceable in the longitudinal direction of the pipe 2 is illustrated.

As previously mentioned, the air channel cross-section area covered by the diffuser portion 12 is the area of the air channel 3 overlapping with the diffuser portion 12 when looked at the diffuser portion 12 in a longitudinal direction of the pipe 2. Thus, this can be fulfilled for different positions of the diffuser portion 12 along the longitudinal direction of the pipe 2 of the air vent device. In other words; the diffuser portion 12 can be positioned just inside or outside of the mouth 6 of the pipe 2.

Figure 7:
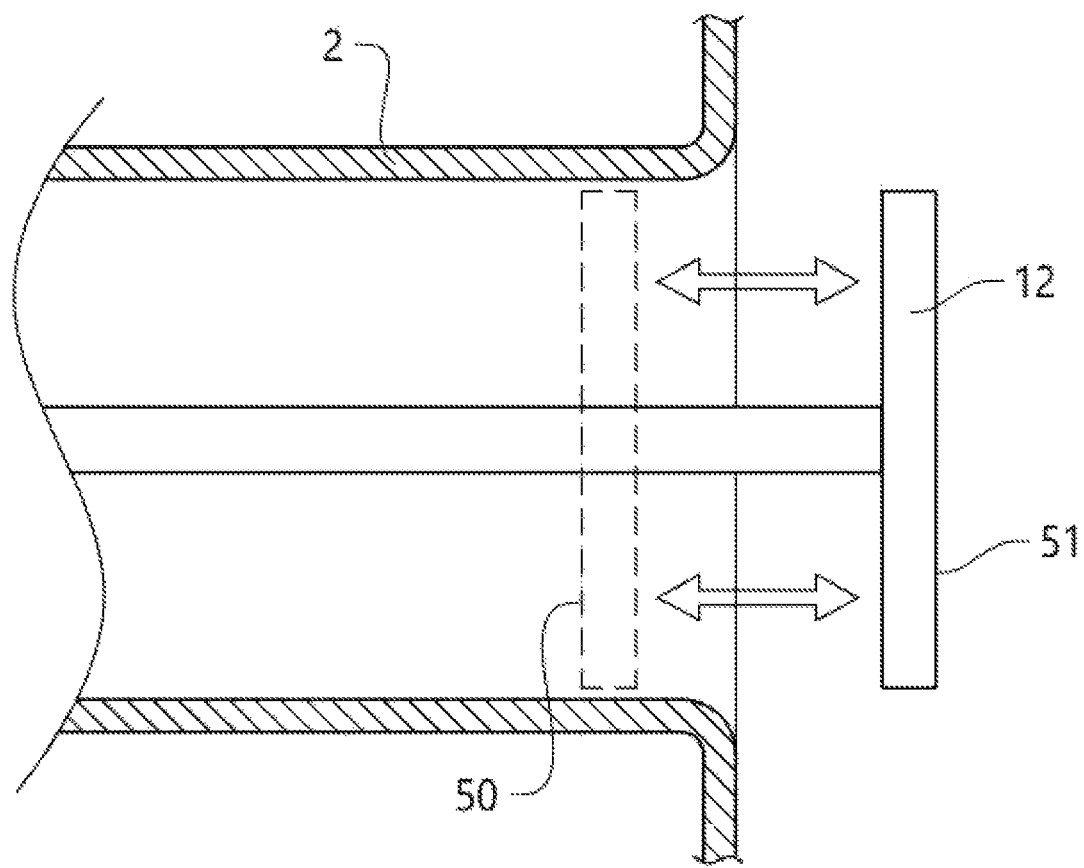
FIG. 7 is a schematic view showing different positions of the diffuser portion relative to the mouth of the pipe.

See also FIG. 7 schematically illustrating different positions of the diffuser portion 12 relative to the pipe 2. The diffuser portion 12 is illustrated both when arranged outside the pipe 2 and inside the pipe 2. A dashed line 50 indicates the position of the diffuser portion 12 when the diffuser portion 12 is most retracted, whereas a solid line 51 indicates the position of the diffuser portion 12 when the diffuser portion 12 is most projected. The diffusor portion 12 is schematically illustrated in FIG. 7 but can of course have any suitable design enabling the size of the covered part of the air channel cross section area to be varied, such as any of the embodiments described in the description and drawings herein.

In FIG. 6, the relative motion of the inner shaft 16 and the outer shaft 17 can be performed by the electric motor 21 connected to the outer shaft 17 through a threaded joint, such as a ball screw, as previously described with reference to FIGS. 3A and 3B. By displacement of the outer shaft 17 and the inner shaft 16 relative to each other, the diffuser portion 12 can be folded and unfolded.

In addition, the air vent device 1 comprises a further electric motor 40 for displacement of the diffuser portion 12 in the longitudinal direction 41 of the pipe 2. The further electric motor 40 can be connected to a sliding component 42 through a threaded joint or similar. The sliding component 42 may comprise a tube 43 which is displaceably arranged inside the pipe 2. The further electric motor 40 is suitably arranged on the outside of the pipe 2 as illustrated. The electric motor 21 and the inner shaft 16 are attached to the tube 43, via struts 44. This means that the electric motor 21, the inner shaft 16, the outer shaft 17 and the diffuser portion 12, i.e. the entire diffuser 11, can be moved in the longitudinal direction 41 by means of controlling the further electric motor 40. In the example embodiment illustrated, a first stop 45 and a second stop 46 of the pipe 2 delimit the movement of the sliding component 42 relative to the pipe 2, thereby defining the most retracted position and the most projected position, respectively, of the diffuser portion 12.

By controlling the electric motor 21 and the further electric motor 40, the size of the part of the cross-section area of the air channel 3 covered by the diffuser portion 12 as well as the position of the diffuser portion 12 in the longitudinal direction 41 of the pipe 2, can be varied and adjusted.

It is to be understood that the present invention is not limited to the embodiments described above and illustrated in the drawings; rather, the skilled person will recognize that many changes and modifications may be made within the scope of the appended claims.

What is claimed is:

1. An air vent device for a ventilation system of a vehicle, the device comprising:
   a pipe forming an air channel through which an airflow flows, a mouth at an end of the pipe that discharged the airflow into a compartment of the vehicle; and a diffuser arranged in the mouth for disturbing the airflow discharged into the compartment, wherein the diffuser has a portion made of a flexible material arranged to cover a part of a cross-section area of the air channel and the diffuser portion is expandable for varying the size of the covered part of the cross-section area of the air channel, the diffuser is foldable between an unfolded state in which the diffuser portion covers a major part of the cross-section area of the air channel and a folded state in which the diffuser portion covers a minor part of the cross-section area of the air channel, and the diffuser portion is displaceable in a longitudinal direction of the pipe for adjustment of the distance between the diffuser portion and the mouth of the pipe while maintaining the air channel cross-section area covered by the diffuser portion;

wherein the diffuser further comprises:

an inner shaft and an outer shaft, the inner shaft and the outer shaft being arranged concentrically relative to each other and one of the inner shaft or the outer shaft telescopically slides relative to the other of the inner shaft or the outer shaft, and pivotable link arms, each pivotable link arm having a first end connected to the diffuser portion and a second end pivotally connected to the telescopically sliding one of the inner shaft or the outer shaft to move the pivotable link arms to shift the diffuser portion between the folded and the unfolded states.

2. A device according to claim 1, wherein said diffuser portion is disc-shaped in the unfolded state of the diffusor.

3. A device according to claim 1, wherein the diffuser portion is made of textile fibres.

4. A device according to claim 3, wherein the diffuser portion is made of a fabric.

5. A device according to claim 1, wherein the diffuser portion is made of rubber material.

6. A device according to claim 5, wherein the diffuser portion is made of a rubber sheet.

7. A device according to claim 1, wherein the diffuser portion is arranged to cover a central part of the air channel cross-section area.

8. A device according to claim 1, wherein the inner shaft and the outer shaft comprise a support member extending in the longitudinal direction in the centre of the pipe and the diffuser portion is arranged on the support member.

* * * * *